United States Patent
Gryspeerdt et al.

(10) Patent No.: US 6,908,379 B2
(45) Date of Patent: Jun. 21, 2005

(54) COMBINE HARVESTER

(75) Inventors: Jose Gryspeerdt, Poesele (BE); Edward H. Priepke, Lancaster, PA (US)

(73) Assignee: CNH America, LLC, Racine, WI (US)

( * ) Notice: Subject to any disclaimer, the term of this patent is extended or adjusted under 35 U.S.C. 154(b) by 38 days.

(21) Appl. No.: 10/786,337

(22) Filed: Feb. 25, 2004

(65) Prior Publication Data

US 2004/0176150 A1 Sep. 9, 2004

(30) Foreign Application Priority Data

Mar. 7, 2003 (GB) ................................. 0305251

(51) Int. Cl.$^7$ ................................................ A01F 12/40
(52) U.S. Cl. ........................................................ 460/111
(58) Field of Search ................................. 460/111, 112, 460/119

(56) References Cited

U.S. PATENT DOCUMENTS

| | | | | |
|---|---|---|---|---|
| 3,712,309 A | * | 1/1973 | Schmitz | 460/112 |
| 4,056,107 A | * | 11/1977 | Todd et al. | 460/112 |
| 4,637,406 A | * | 1/1987 | Guinn et al. | 460/112 |
| 6,547,169 B1 | | 4/2003 | Matousek et al. | |
| 6,656,038 B1 | * | 12/2003 | Persson | 460/112 |
| 2003/0003974 A1 | * | 1/2003 | Niermann et al. | 460/111 |
| 2003/0114207 A1 | * | 6/2003 | Wolters et al. | 460/111 |
| 2004/0029624 A1 | * | 2/2004 | Weichholdt | 460/112 |
| 2004/0092298 A1 | * | 5/2004 | Holmen | 460/111 |
| 2004/0137974 A1 | * | 7/2004 | Weichholdt | 460/112 |

FOREIGN PATENT DOCUMENTS

| | | | |
|---|---|---|---|
| DE | 35 29 801 C1 | * | 1/1987 |
| EP | 0 357 090 A2 | * | 9/1989 |
| EP | 0727135 A1 | | 8/1996 |
| WO | WO 92/05687 | * | 4/1992 |
| WO | WO 01/01754 A1 | | 1/2001 |

* cited by examiner

Primary Examiner—Thomas B. Will
Assistant Examiner—Nathan S Mammen
(74) Attorney, Agent, or Firm—Brant T. Maurer; Rebecca Henkel

(57) ABSTRACT

A combine harvester has at its rear end separate chaff and crop residue discharge openings. A chopper is provided for cutting the crop residue into small pieces, and a chaff discharge device serves to disperse the chaff exiting from the chaff discharge opening. The chaff discharge device is movable between a first position, in which chaff can fall to the ground without passing through the chaff discharge device to lie in a string behind the combine harvester, and a second position, in which the chaff passes through the chaff discharge device and is dispersed laterally away from the combine harvester. The chaff discharge device is further movable to a third position in which chaff leaving the chaff discharge device is directed to enter the chopper through an opening that is different from the opening through which the crop residue is admitted into the chopper.

8 Claims, 3 Drawing Sheets

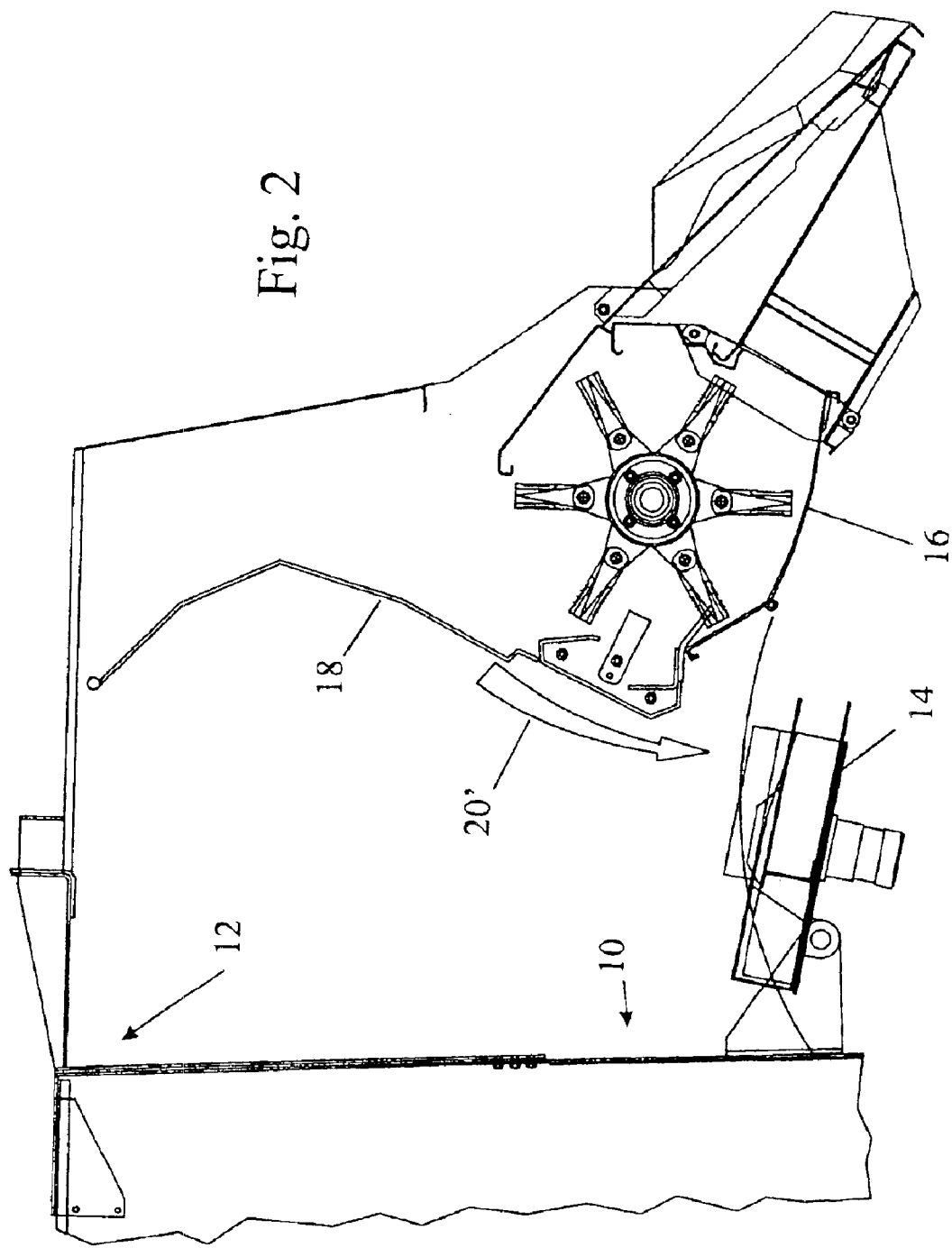

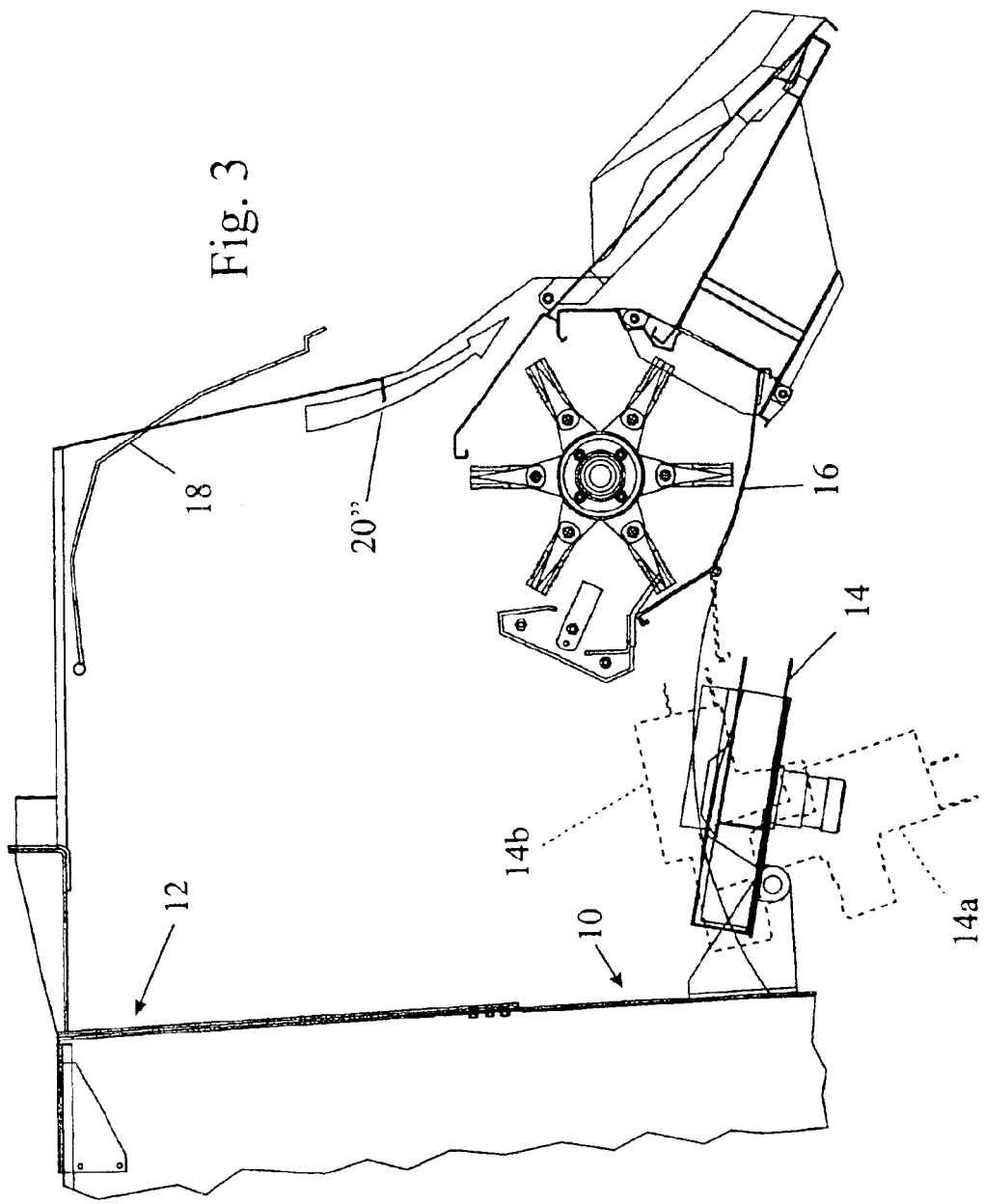

COMBINE HARVESTER

CROSS REFERENCE TO RELATED PATENT APPLICATIONS

Priority is hereby claimed under 35 U.S.C. 119 to Great Britain Patent Application GB 0305251.1, titled "Combine Harvester", filed Mar. 7, 2003, and having Jose Gryspeerdt and Edward H. Priepke as inventors.

BACKGROUND OF THE INVENTION

The present invention relates to a combine harvester.

After a crop has been cut from a field by a combine harvester, it is processed by a threshing mechanism, beaters, shakers and a sieve unit to separate the grain from the remainder, which is made up of crop residue and chaff. The type of crop residue will depend on the nature of the crop being harvested, and the term is used herein to include such larger items as straw, stalks, corn cobs and other thick plant parts. The chaff on the other hand is much finer and includes such items as husks.

It is well known, for example from WO01/01754, for the crop residue and the chaff to be discharged separately from the rear of the combine harvester and to be processed differently, the crop residue being discharged from shakers that are positioned above and to the rear of a sieving unit from which the chaff is discharged.

As explained in the introduction of WO01/01754, modern combine harvesters are becoming ever larger with cutting tables which are significantly wider than the width of the harvester proper. For various reasons, amongst them the risk of fire resulting from the heat generated by such large combine harvesters, it is important to be able to disperse the crop residue and the chaff as far sideways and backwards as possible from the combine harvester.

To disperse the crop residue, a chopper is provided to receive and process the material discharged from the shakers. The chopper cuts the crop residue into small pieces which are then dispersed to the side and rear of the harvester. A chaff discharging device is also provided at the discharge end of the sieving unit. The chaff discharging device may comprise a blower that can disperse the chaff sideways and rearwards over a large area. The area over which the crop residue and the chaff are dispersed is preferably as wide as the cutting table so that they can later both be ploughed back uniformly into the soil.

It is sometimes preferred not to cut the crop residue in the chopper but instead to lay strings or swaths behind the combine harvester for later collection. This could be done for example with straw so that the straw may later be massed into bales or it may be done with corn cobs to avoid damaging the cutting blades of the chopper.

It is therefore known to provide a deflector at the inlet of the chopper that can be set to one of two positions. In the first position, the inlet of the chopper is uncovered and the crop residue flows into the mouth of the chopper so that it may be chopped and dispersed as earlier described. In the second position, the deflector covers the mouth of the chopper so that instead of entering into the chopper, the crop residue falls to the ground in the gap between the chaff discharging device and the chopper forming a swath behind the combine harvester.

It has also been proposed in U.S. Pat. No. 6,547,169, assigned to CNH America LLC and titled "Crop Residue Spreader for an Agricultural Combine", to disperse the chaff using a spreader rather than a blower, the spreader being designed to be capable of spreading the crop residue as well as the chaff. With the deflector positioned to prevent the crop residue from entering the chopper, the spreader can be set in either of two positions. In the first position, it allows the crop residue to fall to the ground to form a swath while in the second position it lies in the path of the crop residue so that the chaff and the uncut crop residue are together dispersed to the side and rear of the combine harvester.

It is further known from WO01/01754 for the chaff discharging device to have two positions. In one position the chaff falls to the ground after passing through the chaff discharge device and in the other it is ejected in a direction to mix with the flow of crop residue. Depending on the position of the deflector plate, the chaff either enters the chopper with the crop residue or is incorporated in the string of crop residue laid down behind the combine harvester.

SUMMARY OF THE INVENTION

According to the present invention, there is provided a combine harvester having at its rear end separate chaff and crop residue discharge openings, a chopper for cutting the crop residue into small pieces, and a chaff discharge device for dispersing the chaff exiting from the chaff discharge opening, wherein the chaff discharge device is movable between a first position in which chaff can fall to the ground without passing through the chaff discharge device to lie in a string behind the combine harvester and a second position in which the chaff passes through the chaff discharge device and is dispersed laterally away from the combine harvester, characterised in that the chaff discharge device is further movable to a third position in which chaff leaving the chaff discharge device is directed to enter the chopper through an opening that is different from the opening through which the crop residue is admitted into the chopper.

Though the prior art teaches an arrangement in which chaff leaving the chaff discharge device subsequently enters the chopper and is dispersed at the same time as the chopped crop residue, the chaff is merely mixed in with the crop residue as it enters the chopper. By contrast, in the present invention, the chaff enters the chopper through a different opening and it can therefore retain its momentum as it enters the chopper. In this way, the chaff discharge device is used to produce a blast containing a suspension of the fine chaff that serves to keep the chopper clean of any crop residue adhering to the blades and assists the chopper in dispersing the chopped crop residue.

As in the above mentioned U.S. Patent, it is preferred for the chaff discharge device to be a spreader capable of spreading not only the chaff but also the crop residue and that in its second position, the chaff discharging device should lie in the path of crop residue prevented by the deflector plate from entering the chopper so that both unchopped crop residue and chaff are dispersed by the chaff discharge device.

Advantageously, in its first position the chaff discharge device permits access to the chaff discharge opening to assist in maintenance.

DESCRIPTION OF THE DRAWINGS

The invention will now be described further, by way of example, with reference to the accompanying drawings, in which:

FIG. 2 is a similar view to that of FIG. 1 showing the deflector plate positioned to direct the crop residue forward of the chopper and the chaff discharging device positioned to spread the uncut crop residue; and FIG. 3 is a further view similar to that of FIG. 1 showing the deflector plate in its position for directing the flow of crop residue over the top of the chopper and three alternative positions of the chaff discharging device.

DETAILED DESCRIPTION OF THE PREFERRED EMBODIMENTS

Figure 1:
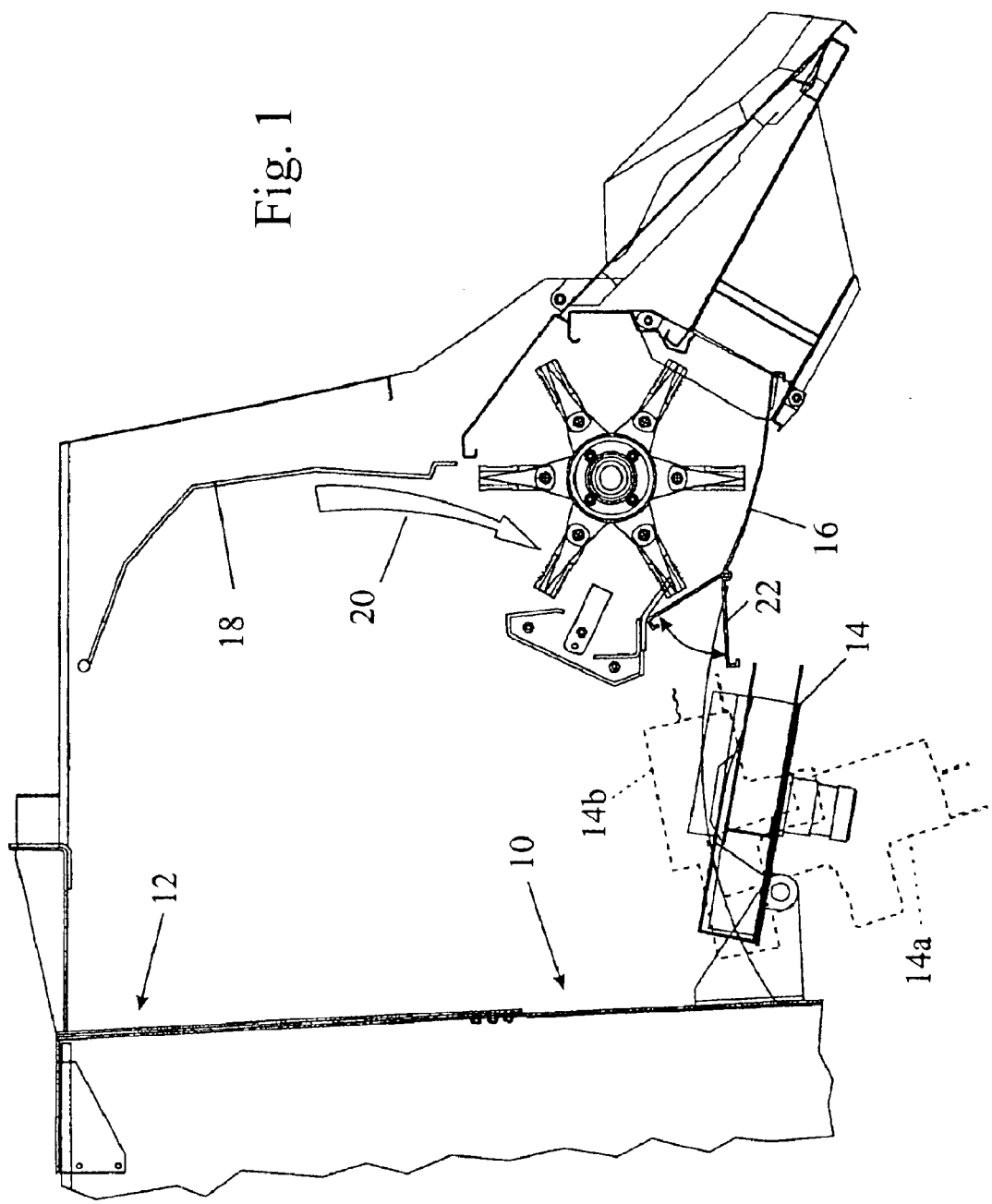
FIG. 1 is a schematic representation of the rear of a combine harvester of the invention, showing the deflector plate positioned to direct the crop residue into the chopper and three alternative positions of the chaff discharging device.

Combine harvesters are of course generally well known per se and one need not therefore be described herein in any great detail. Instead reference may be made for example to the above mentioned WO01/01754 which shows a combine harvester in its first figure and the second figure of which corresponds to the parts of the combine harvester shown in the accompanying drawings. It suffices for the purposes of the present invention to know that the various threshers, beaters, shakers and sieves within the combine harvester separate the grain, the chaff and the crop residue from one another. The chaff and the crop residue are discharged separately from the rear end of the combine harvester, the chaff discharge opening being designated 10 in the accompanying drawings and being disposed beneath the crop residue discharge opening 12.

A discharge device 14 is mounted below the chaff discharge opening 10. The discharge device 14 is constructed as a spreader which can be used to spread either the chaff alone or the chaff and uncut crop residue over an area as wide as the cutting table of the combine harvester. The spreader is not herein described in detail as it is in itself known. The spreader may be constructed, for example, in the manner described in WO01/01754, wherein the spreader comprises two tables with up-standing blades rotatable in opposite senses and surrounded by arcuate deflectors. Material fed on to the tables is spun around by the rotating tables and flung laterally and rearwards.

A chopper 16 is mounted to the rear of the chaff spreader 14. Once again, the chopper is itself well known and need not the described in detail within the present context. The crop residue is cut by the interaction of stationary and rotating blades and is then spread laterally and rearwards.

A deflector plate 18 is pivotably mounted above on the rear of the combine harvester to guide the flow of crop residue exiting from the rear of the combine harvester.

In the position of the deflector plate 18 shown in FIG. 1, the crop residue follows the path represented by the arrow 20 into the mouth of the chopper 18. The crop residue in this position thus passes through the chopper and is cut and dispersed over the ground.

With the deflector plate 18 in the position illustrated in FIG. 1, the chaff spreader 14 can adopt one of three positions. In the position shown in solid lines in FIG. 1, the chaff is spread by the spreader 14 so that both the chaff and the chopped crop residue are dispersed over a wide area. The spreader can however also be lowered into the position shown in dotted lines and designated 14a in which the chaff does not pass through the spreader 14 but falls to the ground in a string. In this second position, the spreader does not obstruct the discharge opening 10 and therefore allows access to the sieves within the combine harvester for maintenance purposes.

In a third position of the spreader 14, shown in dotted lines and designated 14b in FIG. 1, the spreader is arranged to direct the chaff into a separate dedicated intake opening of the chopper 16 which is covered by a pivotable flap 22. When the spreader is in its position designated 14b, the flap is lowered and the chaff is blasted into the chopper 20 separately from the crop residue. In this way, the chaff is used to assist in propelling the chopped crop residue to spread it over a wider area and also to prevent the crop residue from building up in any part of the chopper.

There are occasions when it is desired to spread the crop residue but not to chop it because doing so would damage the cutting blades of the chopper 16. This is achieved by moving the deflector plate 18 and the spreader 14 to their positions shown in FIG. 2. The deflector plate 18 in this position, prevents the crop residue from entering into the chopper 16 and instead the crop residue follows the path represented by the arrow 20' to pass forward of the chopper 16 on to the spreader 14. The spreader 14 will then spread the chaff and the uncut crop residue together over a wide area.

It would be possible with the deflector 18 in the position shown in FIG. 2 to pivot the spreader to the position designated 14a in FIG. 1. This should result in the crop residue and the chaff being deposited together in a string as proposed in FIG. 6 of WO01/01754. In practice however, the crop residue can build up and create a blockage in the space forward of the chopper 16.

To avoid this problem, the deflector 18 has a third position, shown in FIG. 3, in which the crop residue is directed to flow over the top of the chopper 16 to fall as a string or swath behind the combine harvester. No special steps need be taken to prevent the crop residue from entering the chopper 16 as most, if not all, of the crop residue will naturally follow the path represented by the arrow 20".

Once again, in this position of the deflector plate 18, the chaff spreader can adopt any of the three positions previously described. Namely, in the position shown in solid lines, the chaff will be dispersed over a wide area while the crop residue is laid down as a string, in the position designated 14a both the chaff and the crop residue will be deposited as strings and in the position designated 14b the chaff from the spreader will pass through the chopper 16 to clean the chopper and assist in dispersing any crop residue that does enter into its mouth.

What is claimed is:

1. A combine harvester having at its rear end separate chaff and crop residue discharge openings, a chopper for cutting the crop residue into small pieces, and a chaff discharge device for dispersing the chaff exiting from the chaff discharge opening, wherein the chaff discharge device is movable between a first position in which chaff can fall to the ground without passing through the chaff discharge device to lie in a string behind the combine harvester and a second position in which the chaff passes through the chaff discharge device and is dispersed laterally away from the combine harvester, characterized in that the chaff discharge device is further movable to a third position in which chaff leaving the chaff discharge device is directed to enter the chopper through an opening that is different from the opening through which the crop residue is admitted into the chopper.

2. A combine harvester as claimed in claim 1, wherein the chaff discharge device is a spreader capable of spreading not only the chaff but also the crop residue and wherein, in its second position, the chaff discharging device lies in the path of crop residue that does not enter the chopper so that both unchopped crop residue and chaff are dispersed simultaneously by the chaff discharge device.

3. A combine harvester as claimed in claim 1, wherein, in its first position, the chaff discharge device permits access to the chaff discharge opening to assist in maintenance of the combine harvester.

4. A combine harvester as claimed in claim 1, wherein the opening in the chopper, through which the chaff from the chaff discharge device enters the chopper, is covered by a hinged flap.

5. A combine harvester comprising:

separate chaff and crop residue discharge openings located at a rear end of the combine harvester;

a chopper for cutting the crop residue into small pieces; and a horizontal chaff discharge device for dispersing the chaff exiting from the chaff discharge opening laterally away from the combine harvester, wherein the chaff discharge device is movable between a first position in which chaff can fall to the ground without passing through the chaff discharge device to lie in a string behind the combine harvester, a second position in which the chaff passes through the chaff discharge device and is dispersed laterally away from the combine harvester, and a third position in which the chaff leaving the chaff discharge device is directed to enter the chopper through an opening that is different from the opening through which the crop residue is admitted into the chopper.

6. A combine harvester as claimed in claim 5, wherein the chaff discharge device is a spreader capable of spreading not only the chaff but also the crop residue and wherein, in its second position, the chaff discharging device lies in the path of crop residue that does not enter the chopper so that both unchopped crop residue and chaff are dispersed simultaneously by the chaff discharge device.

7. A combine harvester as claimed in claim 5, wherein, in its first position, the chaff discharge device permits access to the chaff discharge opening to assist in maintenance of the combine harvester.

8. A combine harvester as claimed in claim 5, wherein the opening in the chopper, through which the chaff from the chaff discharge device enters the chopper, is covered by a hinged flap.

\* \* \* \* \*